M. B. MORGAN.
SANITARY BED PAN.
APPLICATION FILED JUNE 30, 1906.
913,836.
Patented Mar. 2, 1909.
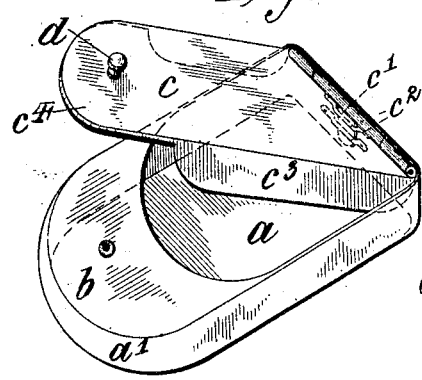
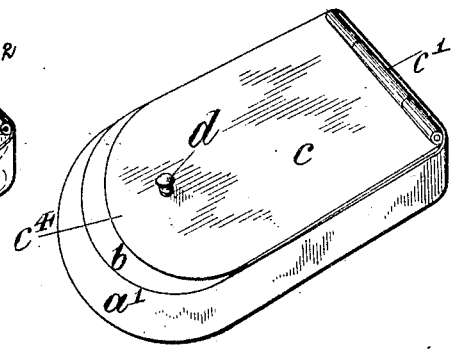
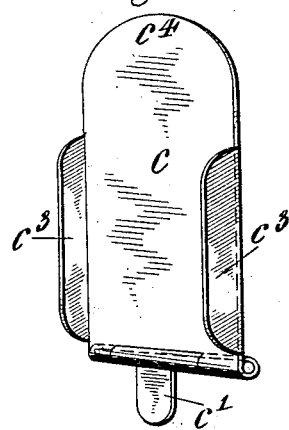
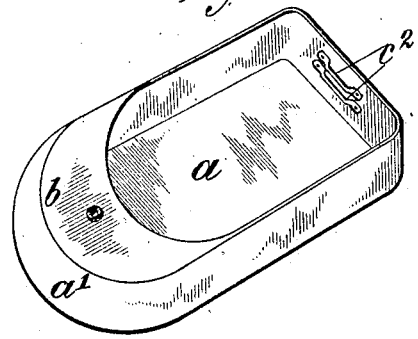
Witnesses
Inventor
May B. Morgan
By her Attorneys
Redding Kiddle Greeley

UNITED STATES PATENT OFFICE.

MAY B. MORGAN, OF NEW YORK, N. Y.

SANITARY BED-PAN.

No. 913,836.    Specification of Letters Patent.    Patented March 2, 1909.

Application filed June 30, 1906. Serial No. 324,166.

*To all whom it may concern:*

Be it known that I, MAY B. MORGAN, a citizen of the United States, and resident of Bath Beach, in the borough of Brooklyn, of the city of New York, State of New York, have invented certain new and useful Improvements in Sanitary Bed-Pans, of which the following is a specification, reference being had to the accompanying drawings, forming a part hereof.

The invention relates to the construction of sanitary bed pans, and the object of the invention is to provide a bed pan which may be used for the various purposes for which such articles are required, and which shall be sanitary in the sense that the parts forming the same may be easily detached and readily cleansed, and which will provide complete protection to the couch or bed upon which the patient may be resting.

The pan is adapted for use with patients of all ages, and is so constructed that the cover will close automatically while the pan is being withdrawn from beneath the patient after its use.

In the accompanying drawings; Figure 1 is a view in perspective of my improved bed pan showing the same in its operative position; Fig. 2 is also a perspective view showing the pan in its closed position; Fig. 3 is a view of the cover detached from the pan, and Fig. 4 is a view of the pan-body showing the means for securing the cover thereto.

The pan body $a$ is preferably rectangular in its general outline and has one end curved as at $a'$. It is provided with a top $b$ which extends over only a portion of the pan and is formed with a depression upon which the patient rests when the pan is in use. Preferably all of the corners of the pan are rounded somewhat as shown in the drawings to facilitate cleaning same. The cover $c$ is detachably secured to the pan by suitable means, such as a leaf $c'$ which engages with straps $c^2$ provided on the inside of the rear end of the pan. These straps may be of wire or strips of tin soldered to the end portion of the pan and provide a simple but effective means of securing the cover in place. The leaf engages on the inside of the pan body and prevents the escape of any discharge over the end of the pan. The cover is also provided on each side with a downwardly extending flange $c^3$ preferably integral with the cover, and fitting snugly the inside of the pan body. These flanges are constructed of sufficient width so that the rear portion of each flange is below the top of the pan body when same is in use. The free end of the cover is rounded as shown at $c^4$, and extends some distance beyond the flanges, and completely closes the pan when it is not in use. A suitable knob $d$ may be provided to raise the cover when desired.

When the pan is used the cover is raised, a suitable distance depending on the size of the patient and the purpose for which the pan is being used, and the legs of the patient are arranged at the sides of the pan entirely out of contact, if desired, with the cover which rests upon and is supported solely by the body of the patient. As the pan is withdrawn after being used the cover drops by gravity into its closed position.

By this construction, all possibility of soiling the bed or couch is effectually prevented, as the flanges on the cover, as well as the leaf which forms the hinge for the cover project within the pan, thus preventing any discharge from escaping over the sides or the end of the pan. Furthermore, the cover falls by gravity and closes the pan automatically, as it is being withdrawn from use, thus preventing the spread of disease, and rendering the subsequent handling of the pan less disagreeable for the nurse or attendant. The fact that the cover can be opened any desired distance makes this pan available for use for every purpose for which such vessel is required and particularly valuable for use with male patients, and since the pan is so constructed that the legs of the patient may lie in natural position at the sides of the pan entirely out of contact therewith, it is evident that the pan can be used with patients of all ages and sizes.

I claim as my invention:

1. A bed pan comprising a receptacle and a cover hinged to said receptacle, said cover being arranged to rest upon the front of the body of the patient when the pan is in use and to close automatically when the pan is withdrawn from use.

2. A bed pan comprising a receptacle and a cover detachably secured thereto and provided with flanges to seat within the receptacle, said cover being adapted to rest upon the front of the body of the patient when the pan is in use and to close automatically when withdrawn from use.

3. A bed pan comprising a body portion having a top partially closing the same, a cover adapted to rest upon the front of the body of the patient when the pan is in use and to close automatically when the pan is withdrawn from use, said cover being provided with downwardly extending flanges formed integral therewith so that a portion of each flange remains within the body portion while the pan is being used, and a leaf hinged to said cover whereby the cover may be detachably secured to said pan, substantially as described.

This specification signed and witnessed this 25th day of June, A. D. 1906.

MAY B. MORGAN.

Witnesses:
HOMER H. SNOW,
O. L. O'SHEA.